US009476249B2

(12) United States Patent
Kim

(10) Patent No.: US 9,476,249 B2
(45) Date of Patent: Oct. 25, 2016

(54) WINDOW HAVING VENTILATION STRUCTURE

(71) Applicant: LG HAUSYS, LTD., Seoul (KR)

(72) Inventor: Se Jin Kim, Cheongju-si (KR)

(73) Assignee: LG Hausys, Ltd., Seoul (KR)

( * ) Notice: Subject to any disclaimer, the term of this patent is extended or adjusted under 35 U.S.C. 154(b) by 17 days.

(21) Appl. No.: 14/432,679

(22) PCT Filed: Dec. 17, 2013

(86) PCT No.: PCT/KR2013/011704
§ 371 (c)(1),
(2) Date: Mar. 31, 2015

(87) PCT Pub. No.: WO2014/098435
PCT Pub. Date: Jun. 26, 2014

(65) Prior Publication Data

US 2015/0240554 A1 Aug. 27, 2015

(30) Foreign Application Priority Data

Dec. 18, 2012 (KR) ........................ 10-2012-0148025

(51) Int. Cl.
*E06B 7/02* (2006.01)
*E06B 3/42* (2006.01)
(Continued)

(52) U.S. Cl.
CPC . *E06B 7/02* (2013.01); *E06B 3/42* (2013.01); *E06B 3/4618* (2013.01); *E06B 5/00* (2013.01); *E06B 7/10* (2013.01); *E06B 7/28* (2013.01); *E06B 1/366* (2013.01); *E06B 2007/023* (2013.01)

(58) Field of Classification Search
CPC .............. E06B 7/02; E06B 5/00; E06B 3/42; E06B 7/28; E06B 3/4618; E06B 7/10; E06B 1/366; E06B 2007/023; E06B 2007/026
USPC .......................................................... 454/208
See application file for complete search history.

(56) References Cited

U.S. PATENT DOCUMENTS 217,630 A * 7/1879 Maull ........................ E06B 7/10 160/97
1,913,067 A * 6/1933 Catlett ...................... E06B 7/02 49/61
2,096,892 A * 10/1937 Gelstharp ............. E06B 3/2605 237/1 R (Continued)

FOREIGN PATENT DOCUMENTS

KR 1020100051986 A 5/2010
KR 1020110016751 A 2/2011
KR 1020110045338 A 5/2011

*Primary Examiner* — Justin Rephann
(74) *Attorney, Agent, or Firm* — Dentons US LLP

(57) ABSTRACT

Disclosed therein is a window having a ventilation structure which can ventilate the indoor air smoothly without regard to weather conditions, such as, yellow dust, rainy season, or localized heavy rain. The window includes: a window frame having upper and lower openings which are divided by a horizontal member; and upper and lower window panes respectively mounted in the upper and lower openings for selectively opening and closing the upper and lower openings, wherein at least a pair of the horizontal members are spaced apart from each other in the window frame, and a ventilation hole is disposed between the horizontal members. The window can ventilate the indoor air smoothly without regard to weather conditions, such as, yellow dust, rainy season, or localized heavy rain, and prevent rain from coming into the room through the open window.

10 Claims, 5 Drawing Sheets

(51) Int. Cl.

| | |
|---|---|
| ***E06B 7/10*** | (2006.01) |
| ***E06B 3/46*** | (2006.01) |
| ***E06B 5/00*** | (2006.01) |
| ***E06B 7/28*** | (2006.01) |
| *E06B 1/36* | (2006.01) |

(56) References Cited

U.S. PATENT DOCUMENTS 2,125,669 A * 8/1938 Fisk .......................... E06B 7/02 454/225
2,344,357 A * 3/1944 Kukis ........................ E06B 3/44 160/128
2,398,914 A * 4/1946 Barrowclough .......... E06B 7/10 49/171
3,259,053 A * 7/1966 Steel .......................... E06B 7/02 454/200
3,675,402 A * 7/1972 Weed .................... F24F 3/1603 160/374
4,338,996 A * 7/1982 Frank ......................... E06B 7/02 160/127
4,641,466 A * 2/1987 Raninen .................... E06B 7/02 454/185
5,279,086 A * 1/1994 Liao .......................... E06B 7/02 49/505
5,675,948 A * 10/1997 Boesch ..................... E04C 1/42 49/498.1
6,007,596 A * 12/1999 Rosen .................... B01D 46/10 55/491
6,321,494 B1 * 11/2001 Oberg ....................... B27B 1/00 49/381
6,357,186 B1 3/2002 Gould
6,374,557 B1 * 4/2002 O'Donnell ................ E06B 7/14 160/44
6,579,169 B1 * 6/2003 Demark .................... E06B 7/02 454/200
7,083,110 B2 * 8/2006 Kim .......................... E06B 7/10 237/46
7,641,545 B2 * 1/2010 Chen ......................... E06B 7/02 126/633
8,221,201 B2 * 7/2012 Christensen .............. E06B 7/10 454/196
8,397,449 B2 * 3/2013 Yun ........................... E06B 7/02 52/204.593
2009/0313922 A1 * 12/2009 Yun ........................... E06B 7/14 52/209
2010/0287856 A1 * 11/2010 Yun ........................... E06B 7/02 52/209

* cited by examiner

WINDOW HAVING VENTILATION STRUCTURE

This application is a National Stage Entry of International Application No. PCT/KR2013/011704, filed Dec. 17, 2013, and claims the benefit of Korean Application No. 10-2012-0148025, filed on Dec. 18, 2012, all of which are hereby incorporated by reference in their entirety for all purposes as if fully set forth herein.

TECHNICAL FIELD

The present invention relates to a sliding window, and more particularly, to a window having a ventilation structure which can easily ventilate indoor air even in case of yellow dust or rain.

BACKGROUND ART

In general, buildings respectively have windows or doors of various kinds which are installed on openings of the buildings in order to block out the inside of the building from the outside, and in this instance, the windows are divided into wooden frame windows and metal frame windows according to used materials. However, recently, the frames for windows or doors are made of plastic.

Now, the process of opening and closing a conventional sliding window will be described. First, when a user slides a window pane in a direction that the window pane is closed in a state where the user grasps a handle of the window pane, rollers mounted below a lower end portion of the window pane rotate along a rail on a window frame. Accordingly, the window pane gradually approaches the window frame of the opposite side, and finally, stops by touching the window frame, so that the closing action of the window is finished.

As described above, the conventional sliding window makes fresh air flow in from the outside through the user's action to open the opening by sliding the window pane in a lateral direction, so as to ventilate air.

However, the conventional sliding window has a disadvantage in that it is difficult to ventilate the indoor air because there is difficulty in opening the window during the rainy weather or the localized heavy rain period.

Moreover, the conventional sliding window installed in a house or an apartment with an expanded veranda has another disadvantage in that, when it rains suddenly, the indoor floor may be damaged due to rain because rain comes into the room through the opened window.

DISCLOSURE OF INVENTION

Technical Problem

Accordingly, the present invention has been made in an effort to solve the above-mentioned problems occurring in the prior arts, and it is an object of the present invention to provide a window having a ventilation structure which can ventilate the indoor air smoothly without regard to weather conditions, such as, yellow dust, rainy season, or localized heavy rain.

Solution to Problem

To achieve the above objects, the present invention provides a window having a ventilation structure including: a window frame having upper and lower openings which are divided by a horizontal member; and upper and lower window panes respectively mounted in the upper and lower openings for selectively opening and closing the upper and lower openings, wherein at least a pair of the horizontal members are spaced apart from each other in the window frame, and a ventilation hole is disposed between the horizontal members.

In this instance, the horizontal member includes: a first member on which the upper window pane is mounted; and a second member horizontally spaced apart from the first member toward the indoor side, the lower window pane being mounted on the second member.

Moreover, at least one of the upper and lower window panes is a sliding window pane.

Furthermore, the upper and lower window panes are mounted in the outdoor side of the window frame and a pair of interior window panes are slidably mounted in the indoor side of the window frame so as to form a double pane window structure.

Additionally, a ventilation kit adapted for improving ventilation and thermal insulation performances is mounted in the ventilation (H).

In addition, the ventilation kit includes: a case forming a main body; an indoor air fan disposed at one side of the inside of the case, the indoor air fan having an indoor air inlet for introducing the indoor air to the inside of the case and an indoor air outlet for discharging out the indoor air to the outside; an outdoor air fan disposed at the other side of the inside of the case, the outdoor air fan having an outdoor air inlet for introducing the outdoor air to the inside of the case and an outdoor air outlet for discharging the introduced outdoor air to the room; and a heat exchanger element part disposed in the middle of the case for exchanging heat between the indoor air and the outdoor air.

Moreover, the heat exchanger element part includes: a first heat exchanger element for firstly exchanging heat between the indoor air and the outdoor air; and a second heat exchanger element for secondly exchanging heat between the indoor air passing through the first heat exchanger element and the outdoor air.

Furthermore, the first and second heat exchanger elements are all sensible heat exchanger elements, all total heat exchanger elements or a combination of a sensible heat exchanger element and a total heat exchanger element.

Additionally, the case includes an outdoor air filter disposed therein for purifying the outdoor air before the outdoor air passes through the heat exchanger element part.

In addition, the case further includes an indoor air filter disposed therein for purifying the indoor air before the indoor air passes through the heat exchanger element part.

Moreover, a screen or a filter for purifying air is selectively mounted in the ventilation hole.

Furthermore, the lower window pane is constructed of fire retarding glass or laminated glass.

Advantageous Effects of Invention

The sliding window according to the present invention can ventilate the indoor air smoothly without regard to weather conditions, such as, yellow dust, rainy season, or localized heavy rain, and especially, can prevent rain from coming into the room through the open window.

Figure 1:
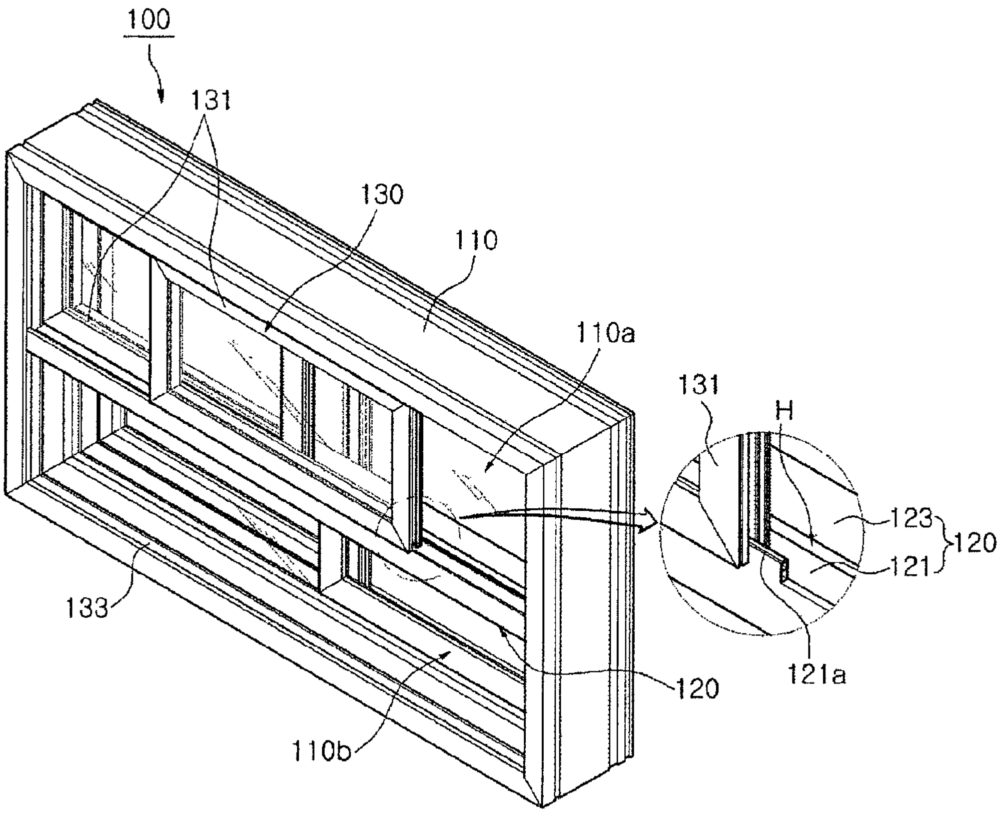
FIG. 1 is a perspective view of a window having a ventilation structure according to a preferred embodiment of the present invention.

| [Explanation of essential reference numerals in drawings] |
|---|
| 110: window frame 110a: upper opening |
| 110b: lower opening 120: horizontal member |
| 121: first member 123: second member |
| 130: exterior window pane 131: upper window pane |
| 133: lower window pane 140: interior window pane |
| H: ventilation hole |

MODE FOR THE INVENTION

Reference will be now made in detail to the preferred embodiment of the present invention with reference to the attached drawings.

In the drawings, the same components have the same reference numerals even though they are illustrated in different figures.

Figure 2:
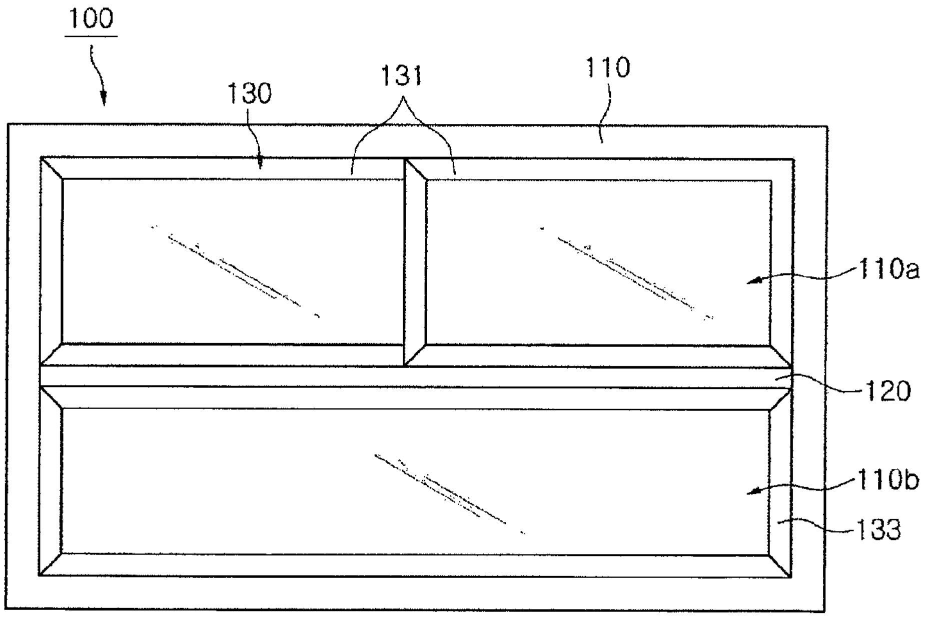
FIG. 2 is an outside elevation view of the window according to the preferred embodiment of the present invention.
Figure 3:
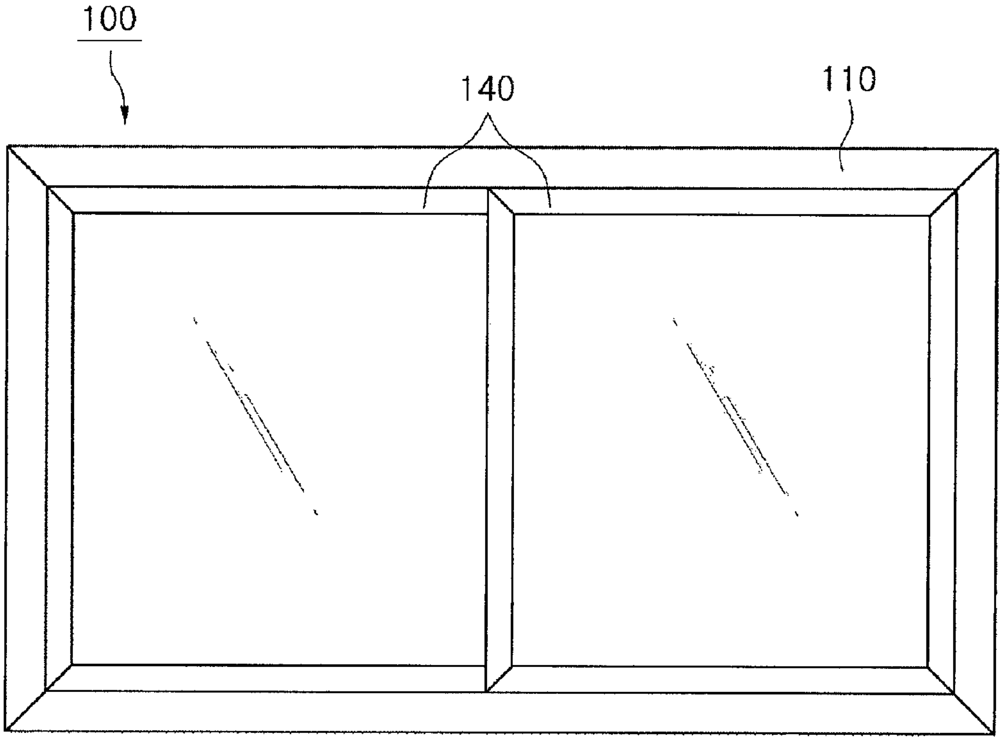
FIG. 3 is an inside elevation view of the window according to the preferred embodiment of the present invention.
Figure 4:
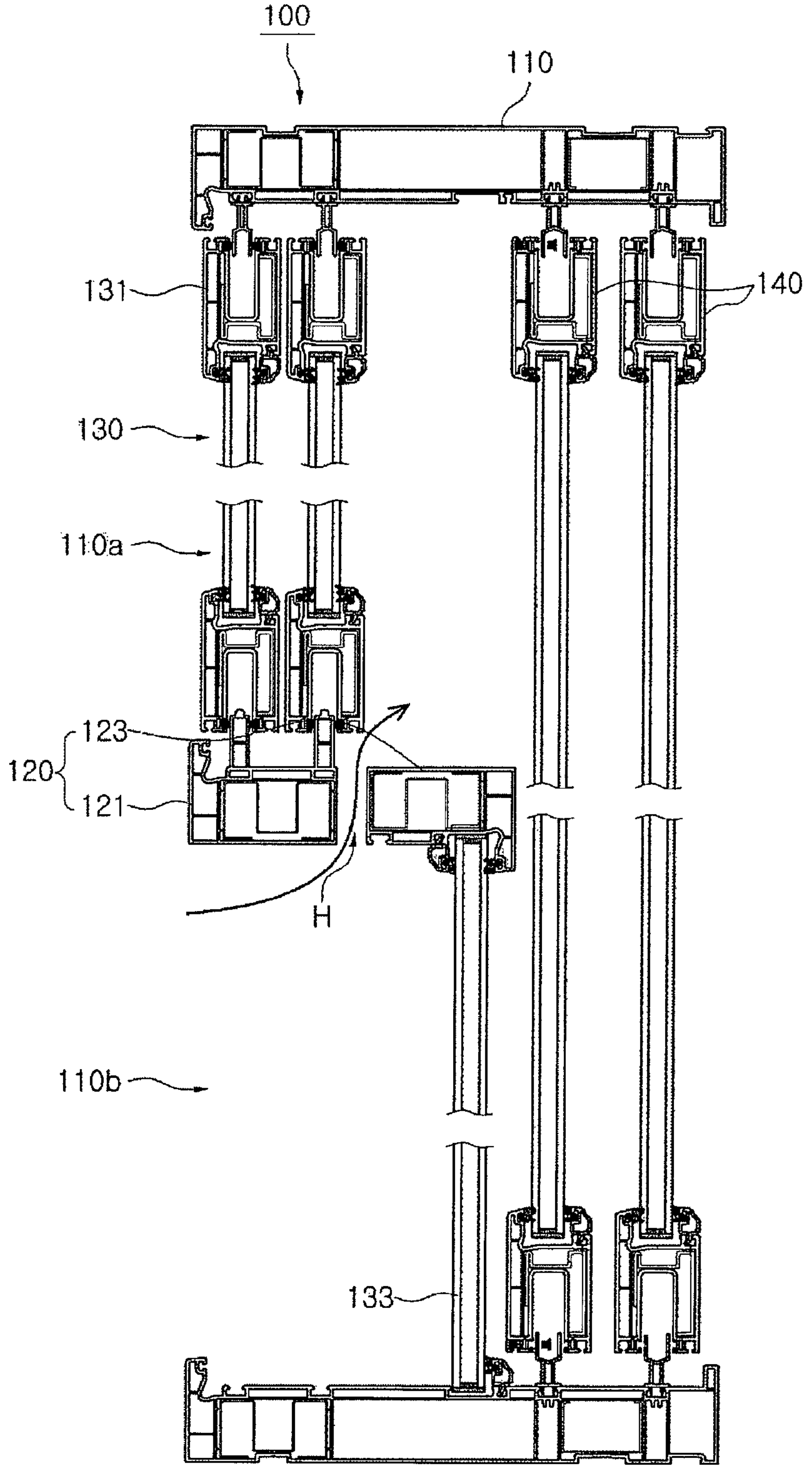
FIG. 4 is a side sectional view of the window according to the preferred embodiment of the present invention.
Figure 5:
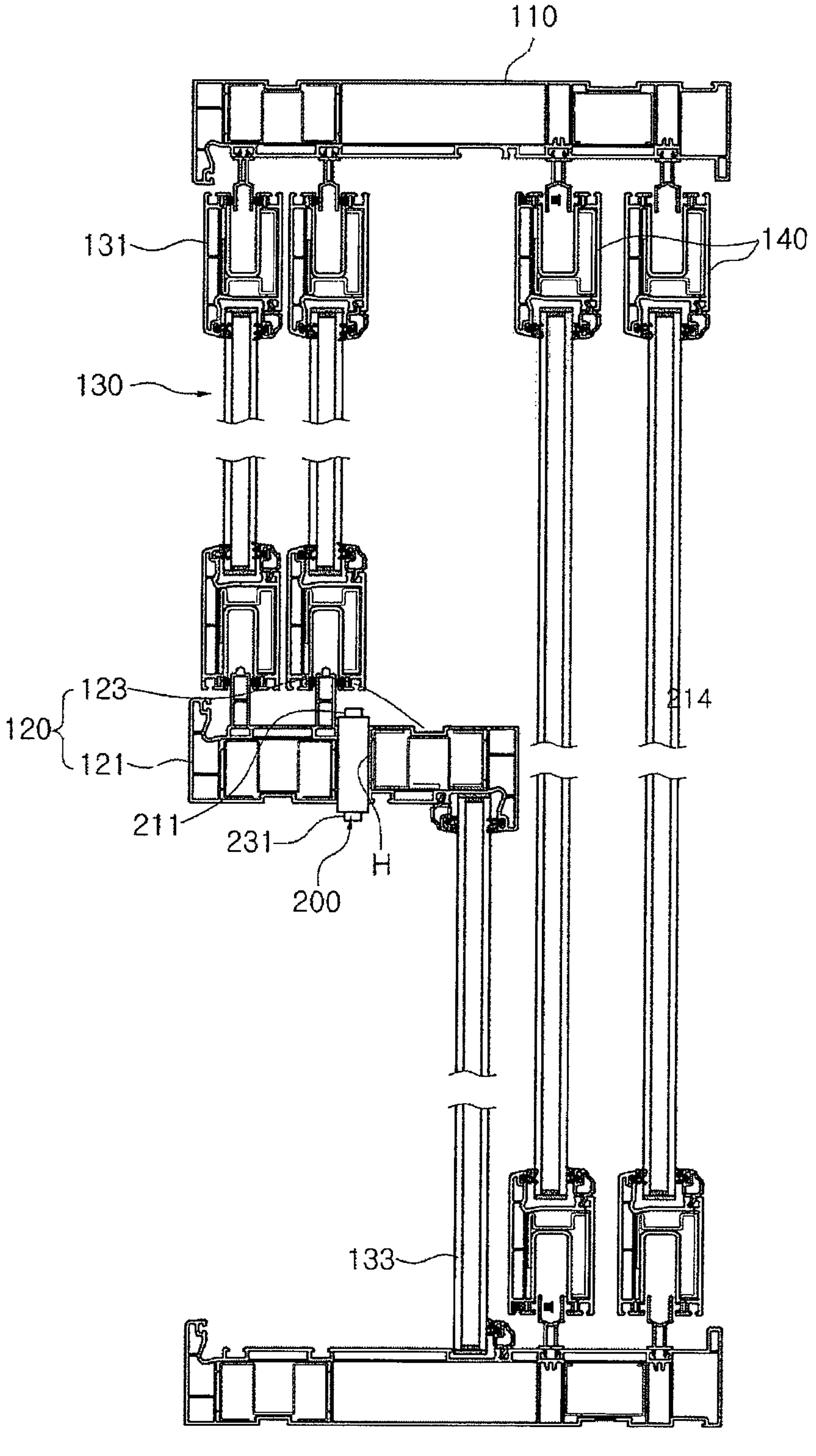
FIG. 5 is a view showing a state where a ventilation kit is mounted in a ventilation hole of FIG. 4.
Figure 6:
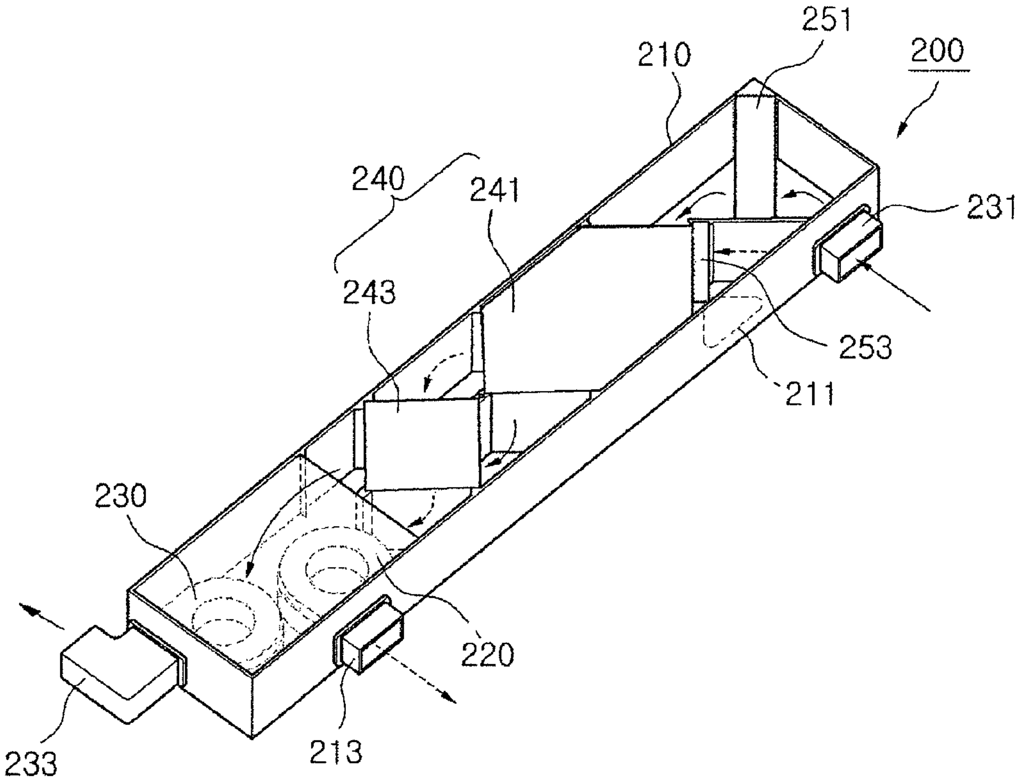
FIG. 6 is a perspective view showing an interior structure of the ventilation kit according to the preferred embodiment of the present invention.
Figure 7:
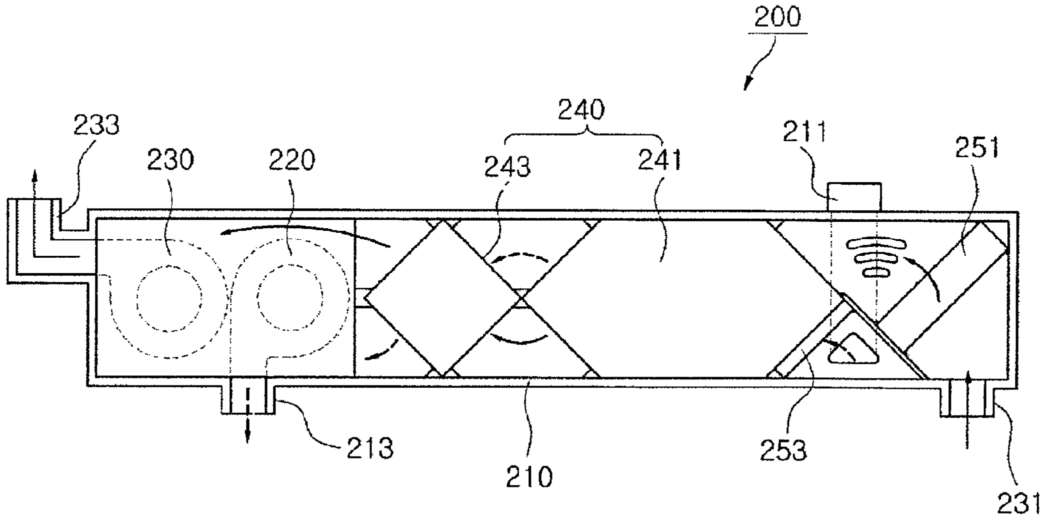
FIG. 7 is a view showing an operational state of the ventilation kit according to the preferred embodiment of the present invention.

FIG. 1 is a perspective view of a window having a ventilation structure according to a preferred embodiment of the present invention, FIG. 2 is an outside elevation view of the window according to the preferred embodiment of the present invention, FIG. 3 is an inside elevation view of the window according to the preferred embodiment of the present invention, and FIG. 4 is a side sectional view of the window according to the preferred embodiment of the present invention.

Referring to FIGS. 1 and 2, the window 100 having the ventilation structure according to the preferred embodiment of the present invention includes: a window frame 110 having upper and lower openings 110*a* and 110*b* which are divided by a horizontal member 120; and upper and lower window panes 131 and 133 respectively mounted in the upper and lower openings 110*a* and 110*b* for selectively opening and closing the upper and lower openings 110*a* and 110*b*, wherein at least a pair of the horizontal members 120 are spaced apart from each other in the window frame 110 and a ventilation hole H is disposed between the horizontal members 120.

The structure of the window 100 according to the preferred embodiment of the present invention will be described in more detail. The horizontal member 120 includes: a first member 121 on which the upper window pane 131 is mounted; and a second member 123 horizontally spaced apart from the first member 121 toward the indoor side, wherein the lower window pane 133 is mounted on the second member 123.

That is, the upper and lower window panes 131 and 133 are respectively mounted above and below the horizontal member 120, and in this instance, the upper window pane 131 protrudes more outwardly than the lower window pane 133. Therefore, even though rainwater lashing toward the upper window pane 131 falls down along the outside window surface, the window according to the preferred embodiment of the present invention can prevent the falling rainwater from coming into the room through the ventilation hole H.

In this instance, at least one of the upper and lower window panes 131 and 133, preferably, the upper window pane 131 is slidably mounted on rails 121*a* which are oppositely mounted inside the window frame 110 and on the upper face of the first member 121. Therefore, the user can selectively open and close the upper window pane 131 so as to ventilate the indoor air.

Furthermore, of course, the lower window pane 133 may adopt fire retarding glass or laminated glass in order to substitute a handrail pole.

Here, it is preferable that the upper and lower window panes 131 and 133 form exterior window panes 130 of the window frame 110 and a pair of interior window panes 140 be slidably mounted on rails (not shown) disposed in the indoor side of the window frame 110 so as to form a double pane window structure.

In the meantime, the ventilation hole H may further include a ventilation kit 200 for improving ventilation and thermal insulation performances of the window. Here, preferably, the ventilation kit 200 includes: a case 210 forming a main body; an indoor air fan 220 disposed at one side of the inside of the case 210 and having an indoor air inlet 211 for introducing the indoor air to the inside of the case 210 and an indoor air outlet 213 for discharging out the indoor air to the outside; an outdoor air fan 230 disposed at the other side of the inside of the case 210 and having an outdoor air inlet 231 for introducing the outdoor air to the inside of the case 210 and an outdoor air outlet 233 for discharging the introduced outdoor air to the room; and a heat exchanger element part 240 disposed in the middle of the case 210 for exchanging heat between the indoor air and the outdoor air.

In this instance, the heat exchanger element part 240 includes: a first heat exchanger element 241 for firstly exchanging heat between the indoor air and the outdoor air; and a second heat exchanger element 243 for secondly exchanging heat between the indoor air passing through the first heat exchanger element 241 and the outdoor air.

Additionally, the first and second heat exchanger elements 241 and 243 may be all sensible heat exchanger elements, may be all total heat exchanger elements or may be a combination of a sensible heat exchanger element and a total heat exchanger element.

Meanwhile, the case 210 may further include an outdoor air filter 251 disposed therein for purifying the outdoor air before the outdoor air passes through the heat exchanger element part 240.

Moreover, the case 210 may further include an indoor air filter 253 disposed therein for purifying the indoor air before the indoor air passes through the heat exchanger element part 240.

As described above, the window 100 having the ventilation structure according to the preferred embodiment of the present invention has the horizontal members 120 mounted inside the window frame 110 such that the upper and lower window panes 131 and 133 can be mounted in such a way as to be spaced apart from each other in the directions of the indoor side and the outdoor side, and the ventilation hole H is disposed between the horizontal members 120. Therefore, even though the user opens only the interior window pane 140 without opening the upper window pane 131 of the outdoor side in case of rain, the indoor air can be easily ventilated through the ventilation hole H disposed between the horizontal members 120.

In this instance, because the upper window pane 131 is mounted more protrudingly toward the outside than the lower window pane 133, even though rainwater falling toward the upper window pane 131 drops down along the outdoor side window surface in case of rain, the window according to the present invention can prevent the rainwater from coming into the room through the ventilation hole H.

The window 100 according to the preferred embodiment of the present invention can easily ventilate the air even in a state where the ventilation kit 200 is not mounted in the ventilation hole H and the outdoor side window pane is not opened, but, it is preferable that the ventilation kit 200 be mounted in the ventilation hole H so as to keep heat insulation and airtightness of the window 100.

Now, the operational principle of the ventilation kit 200 will be described as follows. First, the outdoor air comes into the case 210 from the outdoor side through the outdoor air inlet 231 by operation of the indoor air fan 220 and the outdoor air fan 230 which are mounted inside the ventilation kit 200, and then, is introduced into the first heat exchanger element 241 through the outdoor air filter 251. At the same time, the indoor air is introduced into the case 210 through the indoor air inlet 211, and then, is introduced into the first heat exchanger element 241 through the indoor air filter 253.

After that, the indoor air and the outdoor air exchange total heat or sensible heat in the first heat exchanger element 241 without mixing, and then, are introduced into the second heat exchanger element 243. After that, the indoor air and the outdoor air exchange total heat or sensible heat in the second heat exchanger element 243 without mixing.

Next, the indoor air and the outdoor air respectively pass through the indoor air fan 220 and the outdoor air fan 230 without mixing, and then, the indoor air is discharged out through the indoor air outlet 213 and the outdoor air is discharged out through the outdoor air outlet 233.

While the present invention has been particularly shown and described with reference to the preferable embodiment thereof, it will be understood by those of ordinary skill in the art that the present invention is not limited to the above embodiment and various changes and modifications may be made therein without departing from the technical idea of the present invention.

Particularly, in this specification and the drawings of the present invention, an exemplary embodiment of the case that the ventilation kit 200 is disposed in the ventilation hole H is described and illustrated, but the present invention is not restricted to the above, and of course, in place of the ventilation kit 200, any one of a screen or a filter for purifying air may be selectively mounted.

The invention claimed is:

1. A window having a ventilation structure comprising:

a window frame having upper and lower openings which are divided by at least one pair of horizontal members; and upper and lower window panes mounted in the upper and lower openings, respectively, for selectively opening and closing the upper and lower openings, wherein the at least one pair of horizontal members comprises a first member on which the upper window pane is mounted; and a second member horizontally spaced apart from the first member toward the inside of a room in which the window is mounted, the lower window pane being mounted on the second member, wherein a ventilation hole is disposed between the first member and the second member, and wherein the upper and lower window panes are mounted on an outer side of the window frame and a pair of interior window panes are slidably mounted on an inner side of the window frame so as to form a double pane window structure.

2. The window according to claim 1, wherein at least one of the upper and lower window panes is a sliding window pane.

3. The window according to claim 1, wherein a ventilation kit adapted for improving ventilation and thermal insulation performances is mounted in the ventilation hole.

4. The window according to claim 3, wherein the ventilation comprises:

a case forming a main body;

an indoor air fan disposed at one side of the inside of the case, the indoor air fan having an indoor air inlet for introducing indoor air to the inside of the case and an indoor air outlet for discharging out the indoor air to the outside;

an outdoor air fan disposed at another side of the inside of the case, the outdoor air fan having an outdoor air inlet for introducing outdoor air to the inside of the case and an outdoor air outlet for discharging the introduced outdoor air to the room; and a heat exchanger element part disposed in the middle of the case for exchanging heat between the indoor air and the outdoor air.

5. The window according to claim 4, wherein the heat exchanger element part comprises:

a first heat exchanger element for firstly exchanging heat between the indoor air and the outdoor air; and a second heat exchanger element for secondly exchanging heat between the outdoor air passing through the first heat exchanger element and the indoor air.

6. The window according to claim 5, wherein the first and second heat exchanger elements are all sensible heat exchanger elements, all total heat exchanger elements or a combination of a sensible heat exchanger element and a total heat exchanger element.

7. The window according to claim 4, wherein the case comprises an outdoor air filter disposed therein for purifying the outdoor air before the outdoor air passes through the heat exchanger element part.

8. The window according to claim 4, wherein the case further comprises an indoor air filter disposed therein for purifying the indoor air before the indoor air passes through the heat exchanger element part.

9. The window according to claim 1, wherein a screen or a filter for purifying air is selectively mounted in the ventilation hole.

10. The window according to claim 1, wherein the lower window pane is constructed of fire retarding glass or laminated glass.

* * * * *